(12) United States Patent
Arodzero et al.

(10) Patent No.: US 10,641,918 B2
(45) Date of Patent: May 5, 2020

(54) ADAPTIVE CARGO INSPECTION BASED ON MULTI-ENERGY BETATRON

(71) Applicant: Radiabeam Technologies, LLC, Santa Monica, CA (US)

(72) Inventors: Anatoli Arodzero, Billerica, MA (US); Sergey V. Kutsaev, Santa Monica, CA (US); Vitaliy Ziskin, Newton, MA (US); Salime Boucher, Santa Monica, CA (US); Finn O'Shea, Los Angeles, CA (US)

(73) Assignee: Radiabeam Technologies, LLC, Santa Monica, CA (US)

( * ) Notice: Subject to any disclaimer, the term of this patent is extended or adjusted under 35 U.S.C. 154(b) by 256 days.

(21) Appl. No.: 15/796,786

(22) Filed: Oct. 28, 2017

(65) Prior Publication Data
US 2019/0129060 A1    May 2, 2019

(51) Int. Cl.
*G01V 5/00* (2006.01)

(52) U.S. Cl.
CPC ................. *G01V 5/0041* (2013.01)

(58) Field of Classification Search
None
See application file for complete search history.

(56) References Cited

U.S. PATENT DOCUMENTS

| 7,453,987 | B1* | 11/2008 | Richardson | G01V 5/0041 378/57 |
| 2015/0043717 | A1* | 2/2015 | Chen | H05H 11/04 378/101 |

* cited by examiner

*Primary Examiner* — Edwin C Gunberg (57) ABSTRACT

The present disclosure relates generally to methods and apparatus for cargo inspection and, more particularly, to X-ray based inspection systems providing radiographic imaging and material discrimination with adaptive control of X-ray source dependent upon characteristics of the cargo under inspection. X-rays are generated utilizing a dual energy interlaced betatron by generation of X-ray pulses with lower- and higher-energies during the same betatron acceleration cycle.

19 Claims, 11 Drawing Sheets

PRIOR ART

Figure 1.

PRIOR ART

Figure 2.

PRIOR ART

ADAPTIVE CARGO INSPECTION BASED ON MULTI-ENERGY BETATRON

CROSS-REFERENCE TO RELATED APPLICATIONS

This application claims the benefit of U.S. Provisional Application No. 62/414,178 titled "Adaptive Cargo Inspection Based on Multi-Energy Betatron" filed Oct. 28, 2016. The entire disclosure of the above application is incorporated herein by reference.

FIELD

The present disclosure relates generally to methods and apparatus for cargo inspection and, more particularly, to X-ray based inspection systems providing radiographic imaging and material discrimination with adaptive control of the X-ray source based upon characteristics of the cargo under inspection.

Definitions

Definitions as used herein and in any appended claims, the following terms shall have the meanings indicated unless the context requires otherwise.

The term "multi-energy" shall refer to an X-ray inspection modality in which differential transmission through a medium by X-rays of distinct spectral composition is used to characterize the medium.

An X-ray detector is mentioned to herein, and in any appended claims, as "fast" if the detector response time is much smaller than the time interval between X-ray pulses of different energies generated during the same betatron acceleration cycle.

The term "scintillation-Cherenkov detector" is referred to herein, shall refer to the X-ray detector that distinguishes signals caused respectively by the scintillation- and Cherenkov mechanism.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The security market requirements for state-of-the-art mobile and portal radiography inspection system include high imaging resolution (better than 5 mm line pair), penetration beyond 300 mm steel equivalent, material discrimination (preferably at least three groups of Z) with preferably 100% image sampling at speeds up to or greater than 16 km/h, low dose and small radiation exclusion zone.

Figure 1:
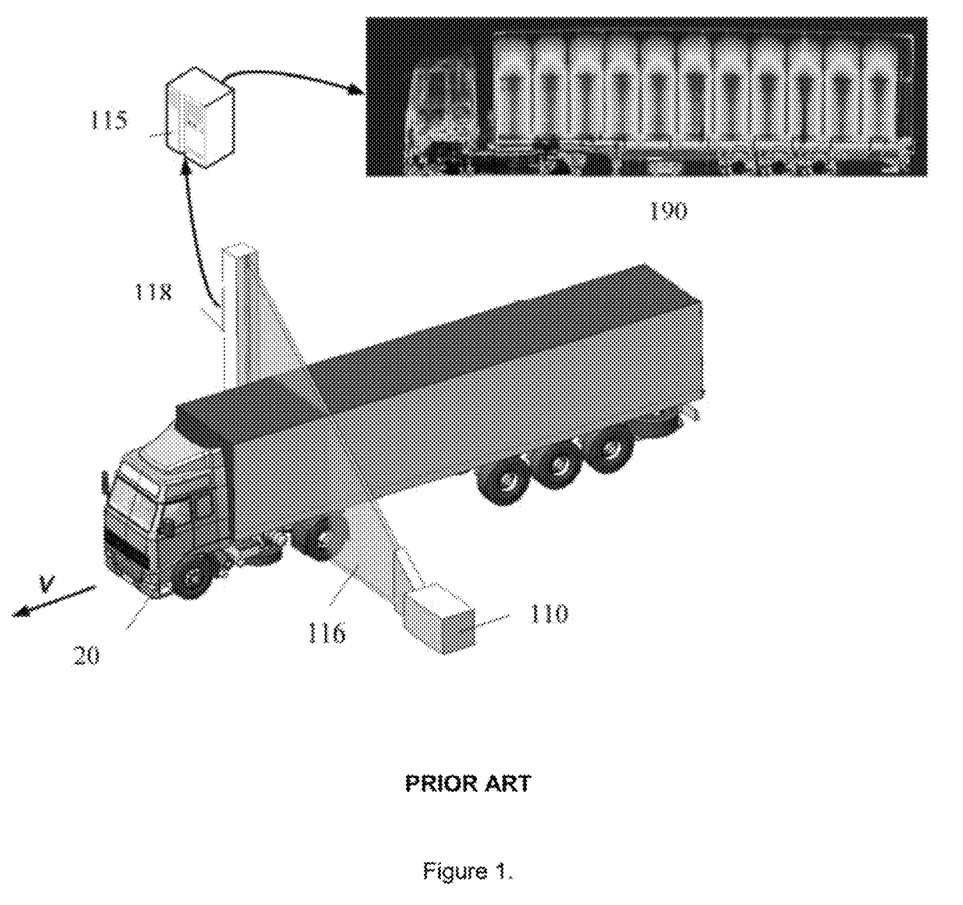
FIG. 1. Example of a cargo x-ray transmission inspection system (prior art).

X-ray security systems for the inspection of cargo 20 and shipping containers typically use transmission radiographic techniques based on the use of an X-ray fan beam 116 generated by a pulsed high-energy X-ray source 110, such as a linear accelerator, linac, or betatron. FIG. 1 (prior art) depicts a cargo inspection system employing such a technique. An array of X-ray detectors 118 is processed 115 to produce an image of the cargo 190.

A fan-shaped beam of X-ray 116, emitted by a linac- or betatron-based source, is detected by elements of a detector array 118 distal to an object, here a cargo truck 20, in order to produce radiographic images of the target object 190. The particular contents of the object may be discriminated and characterized on the basis of the transmission of X-rays through the object and their detection by the detector array and its individual detector pixels. Signals from each of the detector pixels, suitably pre-processed, provide inputs to processors, where the radiographic image of the object and material characteristics are computed. The thickness of the material to be penetrated by the X-rays may exceed 400 mm of steel equivalent in some cases. To insure the required penetration, inspection systems typically use X-rays with a maximum energy of several MeV, currently up to about 9 MeV. X-rays in excess of 1 MeV are frequently referred to as high-energy X-rays.

Information (such as mass absorption coefficient, effective atomic number $Z_{eff}$, electron density, etc.) about the material composition of the contents of objects may be obtained on the basis of the interaction of the X-rays with the material, and, more particularly, by illuminating the material with X-ray beams having energy spectra with more than one distinct energy endpoint (peak energy), or by employing energy discriminating detectors. Dual energy methods of material discrimination are known in the art and are widely used in X-ray inspection systems for security control of cargo in checkpoints. Dual energy and multiple energy inspection is discussed in the following references, for example, which are incorporated herein by reference: W. Neale, et al. "Material Identification using X-Rays", U.S. Pat. No. 5,524,133 (1996), V. Novikov, et al. "Dual energy method of material recognition in high energy introscopy systems", International Workshop on Charged Particle Linear Accelerators: Problems of Atomic Science and Technology, pp. 93-95 (1999); S. Ogorodnikov, et al. "Application of high-penetrating introscopy systems for recognition of materials", Proceedings of EPAC 2000, Vienna, Austria, pp. 2583-2585; S. Ogorodnikov and V. Petrunin, "Processing of interlaced image in 4-10 MeV dual energy customs systems for material recognition", In: Physical review special topics Accelerators and beams, Vol. 5, 104701 (2002), 11p; P. Bjorkholm, "Dual energy radiation scanning of objects", International Patent application WO 2005/084352 (2005); and S. Chakhov, et al. "Betatron Application in Mobile and relocatable Inspection Systems for Freight Transport Control", Journal of Physics: Conference Series 671 (2016) 012024, DOI: 10.1088/1742-6596/671/1/012024.

Figure 2:
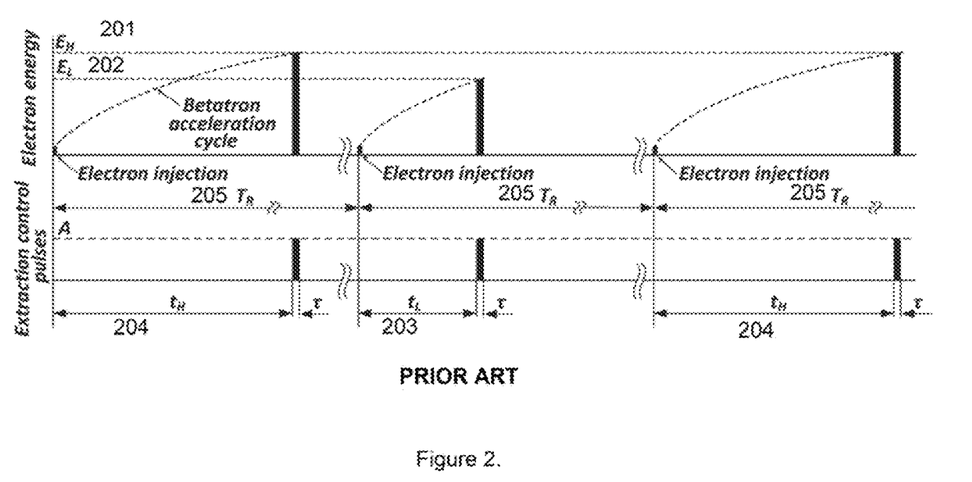
FIG. 2. A time diagram of operation of conventional dual-energy interlaced betatron (prior art).

Conventional dual-energy linac- or betatron-based cargo inspection systems capable of material discrimination provide X-ray pulses with two end-point energies 201, 202 (typically 4 and 7.5 MeV, or 5 and 9 MeV) alternating from pulse to pulse with a repetition rate up to 400 pps 205 (see FIG. 2 for dual-energy interlaced betatron). In the case of the betatron-based system the values of low- and high-end-point energies are determined by the corresponding predefined extraction time intervals $t_L$ 203 and $t_H$ 204 within the betatron acceleration cycle. The typical duration of each X-ray pulse is about four microseconds 206.

A multi-energy cargo inspection system based on race-track microtron is presented in U.S. Pat. No. 8,761,335. The disadvantages of this proposed system are: that system can generate X-ray pulses with just fixed step energies, four steps system discussed in that patent; radiography performance of the inspection system based on race-track microtron is limited by beam current instabilities; the control system required for such microtron is very complicated and didn't allow adaptive control of the parameters of X-ray pulse.

The advantages of the betatron-based inspection systems over conventional linac-based designs include extended region of thickness of material discrimination validity, larger penetration, small focal spot (which improves the resolution), low weight and form-factor, smaller exclusion zone, simpler control system and relatively low cost.

Figure 3:
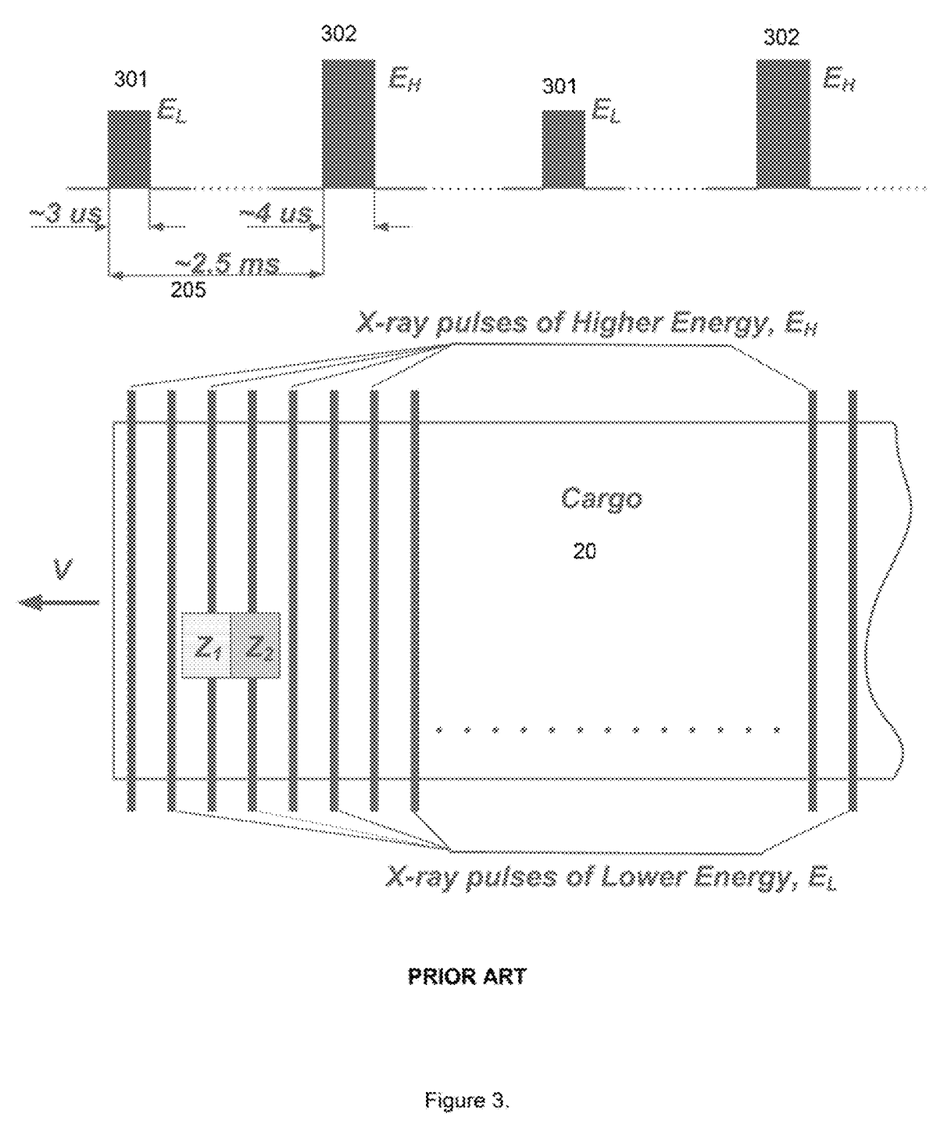
FIG. 3. Separation of regions illuminated by lower- and higher-energy X-ray pulses during scanning of moving cargo (prior art).

However, this approach has three major limitations. First, the long time (>2 ms) between two energy pulses results in an inability to illuminate a single imaging slice with both energies in moving cargo 20. Therefore, conventional dual-energy material discrimination technique will not deliver accurate information about the regions average Z, see FIG. 3. Second, even at a repetition rate of 400 pps 205 some portion of the moving cargo is not sampled due to the detector element size and object motion effects (undersampling). Finally, this technique forces a choice of only two fixed energy levels 301, 302 which may only be suitable for material discrimination within a limited region of object areal densities. It has no ability to adapt beam energies to the real-time X-ray attenuation in cargo. This fact significantly limits material discrimination in regions of low or high densities, and unnecessarily increases the dose to the environment. For most cargoes, much lower X-ray end-point energies are sufficient to achieve cargo penetration and material discrimination.

Thus, there is a need for an adaptable inspection system able to overcome the foregoing deficiencies and provide enhanced material identification adaptable to variable characteristics of the cargo under inspection.

BRIEF DESCRIPTION

The disclosed Multi-Energy Betatron-based Cargo Inspection System, MEBCIS, presented herein uses an innovative technique of extracting two X-ray pulses with lower- and higher-energies within a single betatron acceleration cycle (in contrast to conventional dual-energy betatrons with one X-ray pulse produced during separate betatron acceleration cycles). In addition to the new betatron, new types of fast X-ray Scintillation-Cherenkov detectors, rapid processing of detector signals, an adaptive detector feedback algorithm for control of the betatron, and algorithms for intelligent material discrimination are parts of the overall MEBCIS system.

An advantage of the MEBCIS concept is that the material discrimination data is acquired in a single scan line rather than two. Thus, for the same betatron pulse rate, the scan rate can be twice as fast (better throughput) or can be done with lower dose, even without adaptive dynamic pulse adjustment. Application of these techniques will maximize material discrimination, penetration, and contrast resolution while simultaneously reducing dose to the environment, resulting in a smaller exclusion zone. Its minimal size and weight will allow MEBCIS to be placed on a lightweight truck chassis.

DETAILED DESCRIPTION

Embodiments of the instant invention overcomes the limitations of cargo inspection systems with a conventional dual energy interlaced betatron by using a combination of some of the following key innovations:
Generation of X-ray pulses with lower- and higher-energies during the same betatron acceleration cycle;
Real-time intelligent setting of energies of pulses depending on the X-ray attenuation in the cargo;
In one embodiment, the use of short X-ray pulses of lower- and higher-energy, pairwise generated in each cycle of betatron acceleration, in combination with fast scintillation-Cerenkov or Cherenkov detectors;
In yet another embodiment, the use of very short x-ray pulses of lower- and higher-energy, pairwise generated in each cycle of betatron acceleration, in combination with scintillation-Cherenkov detectors with a slow rise time scintillation;
And in yet another embodiment, the use of long x-ray pulses of lower- and higher-energy, pairwise generated in each cycle of betatron acceleration, in combination with detectors operating in the X-ray photon counting mode.

Generation of X-Ray Pulses with Lower- and Higher-Energies During the Same Betatron Acceleration Cycle.

The betatron can be considered as a transformer, where the secondary coil is replaced by a plurality of electrons circulating in a doughnut-shaped vacuum chamber. A time-varying magnetic field is enclosed by the electron orbit and the electrons gain energy in each turn, which is equal to the electromotive force generated by the varying magnetic field. Since electron velocities are large, approaching the speed of light at a few MeV, the electrons make many revolutions in a short time and acquire a high energy. A stable equilibrium orbit is determined from the Wideroe condition depending on the course of the magnetic field and its change with time and requires for orbit stability that the field at the orbit be half the average flux density enclosed by the orbit.

Figure 4:
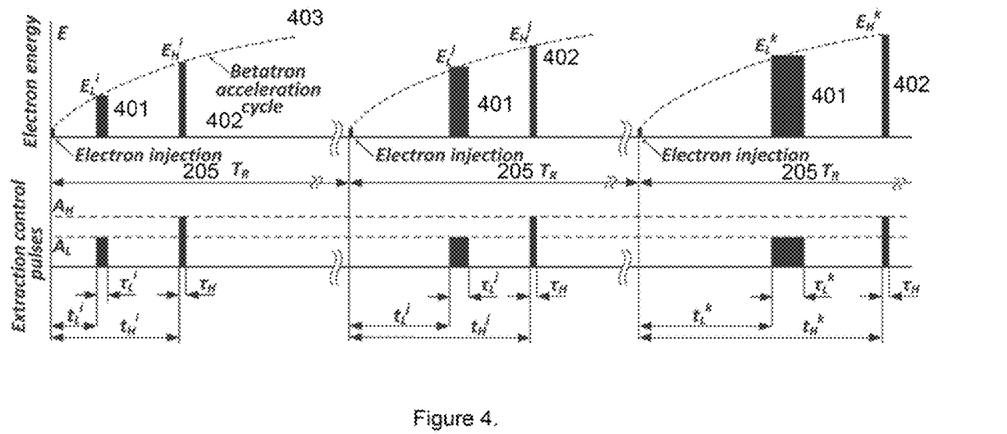
FIG. 4. A time diagram of operation of the betatron with adaptive generation of lower- and higher-energy pulses within same betatron acceleration cycle.

In contrast with the conventional dual-energy betatron, where X-ray pulses (low and high energies) generated in interlaced betatron acceleration cycles, in one embodiment both, low- 401 and high-energy 402 pulses are generated in same betatron acceleration cycle 403, see FIG. 4. In one embodiment of the dual-energy extraction, the equilibrium orbit of the electrons is perturbed via an orbit expander coil until the beam partially intercepts the X-ray converter. Afterwards, the beam orbit is returned to the equilibrium location, acceleration continues until the desired higher energy is reached, then the orbit of the electrons is perturbed again, and the beam intercepts the X-ray converter. In some embodiments the orbit expander coil can be activated multiple times (two, three or more) to produce multiple pulses of different electron energy, thus multiple pulses of different X-ray end point energy. Such multiple pulses can be used by the material decomposition algorithms to extract additional information on the material composition of the inspected cargo.

The orbit expander coil can be configured in various embodiments, all within the scope of the instant invention. In one embodiment an internal coil could be incorporated internal to the betatron vacuum chamber. In another embodiment coils external to the vacuum chamber can be mounted to produce magnetic field with at least some portion of the produced magnetic field perpendicular to the electron orbital velocity. In another embodiment an electric field can be introduced to modify the electron orbits. For any embodiment the basis for extraction of X-rays of two or more energies is the temporary distortion of the electron beam orbit to be nearer the X-ray generation target than the equilibrium (storage and acceleration) orbit. This distortion may be accomplished by adjustment of the magnetic fields in the betatron. The distortion can move the electron orbit radially to larger orbit radius or in to smaller orbit radius; alternatively, the orbit can be moved vertically up or down. Any combination of the previous can also be used, as can orbit distortions that change the shape of the orbit from circular to some other closed shape, such as an ellipse. One skilled in the art could incorporate other ways to introduce either an electric field or a magnetic field or a combination thereof to modify the electrons orbits to accomplish the electron orbital modifications described herein, all of which are within the scope of the instant invention.

The increase in electron energy during acceleration is approximately linear. In compact betatrons used for cargo inspection, the rate of electron acceleration is about 0.01 MeV/microseconds, therefore the total time to reach energy 9 MeV, will be about 1 millisecond. Thus, if a fraction of the electron beam is directed at the X-ray converter partway through the acceleration cycle, low energy X-ray pulse can be created before the maximum electron beam energy is reached.

In one embodiment this procedure is performed rapidly to produce finite "bursts" of x-rays at fixed times during the acceleration cycle, or in an alternate embodiment this procedure is performed smoothly to produce a more continuous distribution of x-rays from the betatron.

There are several methods of extraction of accelerated electrons from equilibrium orbit that are suitable for proposed technique, for example: the regenerative method; the electro-magnetic method; and the electrostatic method. The technical implementation of these methods is well known in the art, for example in V. Solomatin. Magnetic extraction of accelerated electrons from small betatrons. Izvestiya Vuzov, Fizika, 8, 1970 pp. 77-81, Published in English by Consultants Bureau, Plenum Publishing Corp., 1973, which is incorporated herein by reference.

Figure 6:
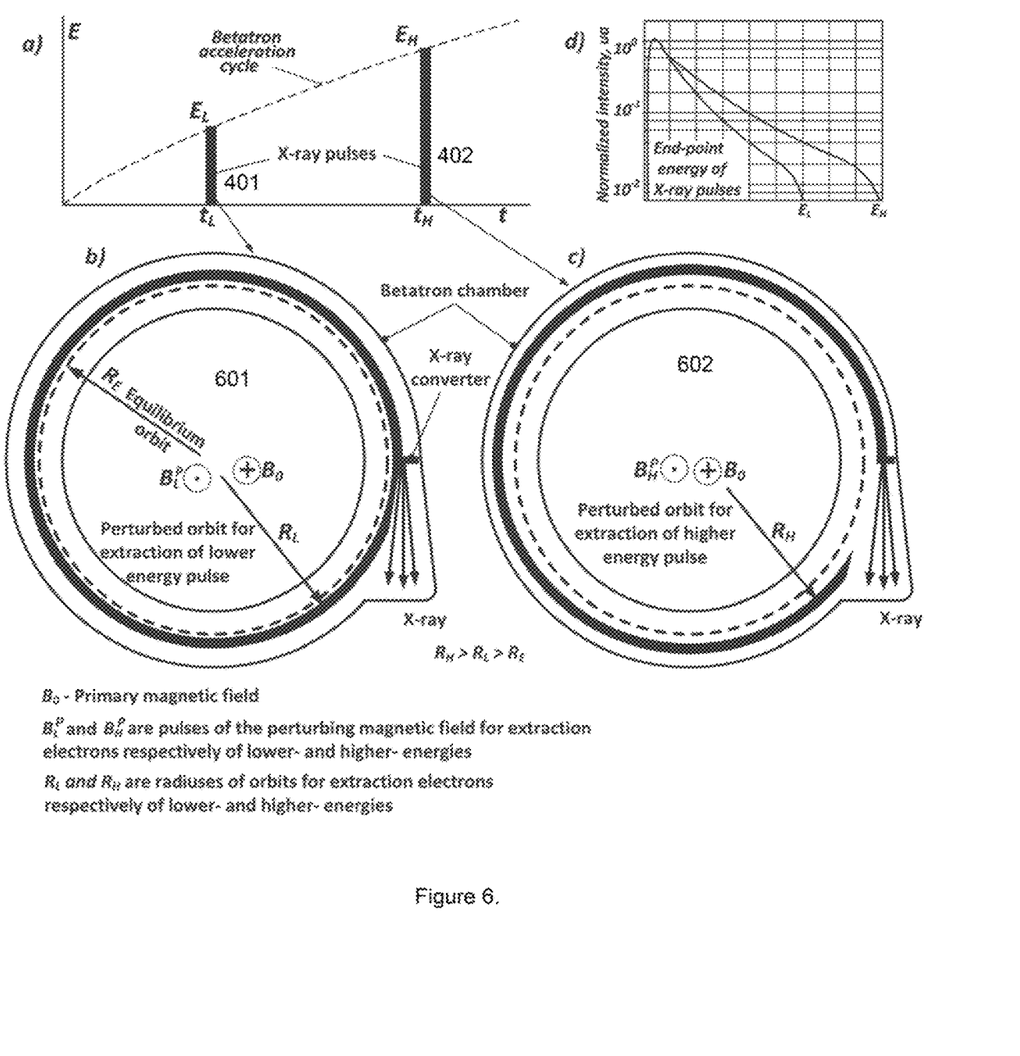
FIG. 6. Embodiment of electron beam modulation. Extraction of lower- and higher-energy electrons within same betatron acceleration cycle. In this dual-energy extraction, the equilibrium orbit of the electrons is perturbed via orbit expander coil until the beam partially intercepts the X-ray converter. Afterwards, the beam orbit is returned to the equilibrium location, acceleration of remaining electrons continues till required high energy will be reached, the orbit of the electrons will be perturbed again and beam entirely intercepts the X-ray converter, right, high energy extraction.

FIG. 6 schematically illustrates one embodiment of the extraction of low- 401, 601 and high-energy 402, 602 electrons using an orbit expander coil or a variable magnetic field generator. One skilled in the art will recognize that other methods of extraction of electrons from equilibrium orbit can also be used. Important requirements for any embodiment of the electron extraction, is control of the electron beam orbit and beam radii in order to control the fraction of the beam that intercepts the X-ray converter at each step of the acceleration cycle.

Such embodiments have the additional benefit of matching appositely the natural losses of the electrons during acceleration. As the electrons are accelerated in the betatron, the dynamic aperture shrinks and electrons are lost even without consideration of multi-energy extraction. Thus, the electron current is always higher at lower energy and that increases the dose one might expect to produce at lower energies.

In one embodiment of the dual-energy inspection system the time interval between pulses of low- and high-energy within same acceleration cycle will be about 400 microseconds, and the corresponding displacement of the cargo under inspection will be no more than one millimeter for an inspection target moving at 16 km/h. Thus, using this embodiment, the inherent deficiency of material discrimination of conventional dual energy interlaced systems will be eliminated.

One skilled in the art of betatron design may devise additional embodiments of the betatron design with changes based on the particular requirements of the particular inspection system (energy range, intensity, dimension etc.). Additional embodiments may include different repetition rates, different end-point energies, and different extraction methods all of which are included in the scope of the instant invention.

Long Duration Low- and High-Energy X-Ray Pulses.

In several embodiments the duration of X-ray pulses (lower- and higher energies) can be up to from several tens of microseconds, for example, or approximately fifty microseconds or up to 100 microseconds. In this embodiment the intensity of the x-ray pulse will be low, and, if no materials between the accelerator and detector are present, the average time interval between individual X-ray photons at the detector can be several tens of nanoseconds. If cargo is present, the time interval between photons will be even longer. Thus, fast detectors with silicon photomultiplier (SiPM) readout, operated in X-ray photon-counting mode can be used. The effect of cumulative saturation of the SiPM will not occur.

With such a duration of X-ray pulses the time interval between arriving of X-ray photons to detector element will be long enough to use an X-ray photon counting mode of operation, and will provide during each pulse the number of X-ray photons needed for good statistics. For example, for a fast $PbWO_4$ detector in photon counting mode, the minimum time interval between individual X-ray photons can be about 30 nanoseconds (time resolution). Therefore, during 50 microseconds pulse duration about 1600 X-ray photons can be registered by detector.

Real-Time Intelligent Setting of Enemies of Pulses Depending on X-Ray Attenuation in Cargo.

Figure 5:
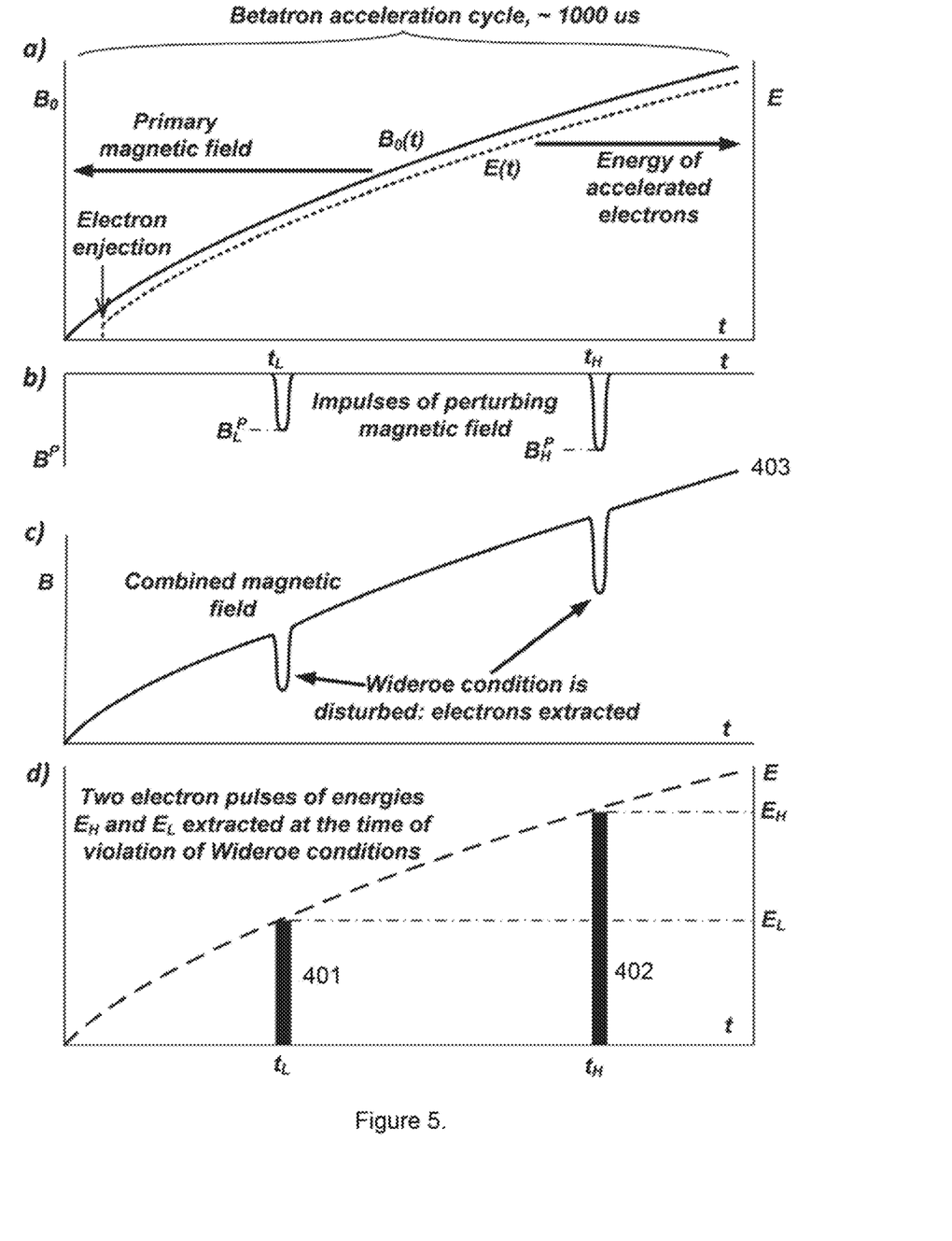
FIG. 5. Generation of two X-ray pulses during same betatron acceleration cycle by use perturbing pulsed magnetic field produced by the additional coil: a) diagram of primary acceleration magnetic field; b) diagram of pulsed, oppositely-directed perturbing magnetic field; c) diagram of combined magnetic field; d) a diagram showing the formation during same cycle of betatron acceleration of two electron pulses of different energies as a result of a short-time violation of Wideroe condition.

In multiple embodiments of the instant betatron-based cargo inspection system detectors collect the dual energy data for material discrimination within the same scan line provided by a low- 401 and high-energy 402 X-ray pulses within the same betatron acceleration cycle 403 (see FIG. 5). This way both high and low energy detector readings belong to the same region of cargo. In further embodiments additional pulses of different energies can be produced from the same betatron acceleration cycle to enhance the material decomposition algorithm.

Figure 7:
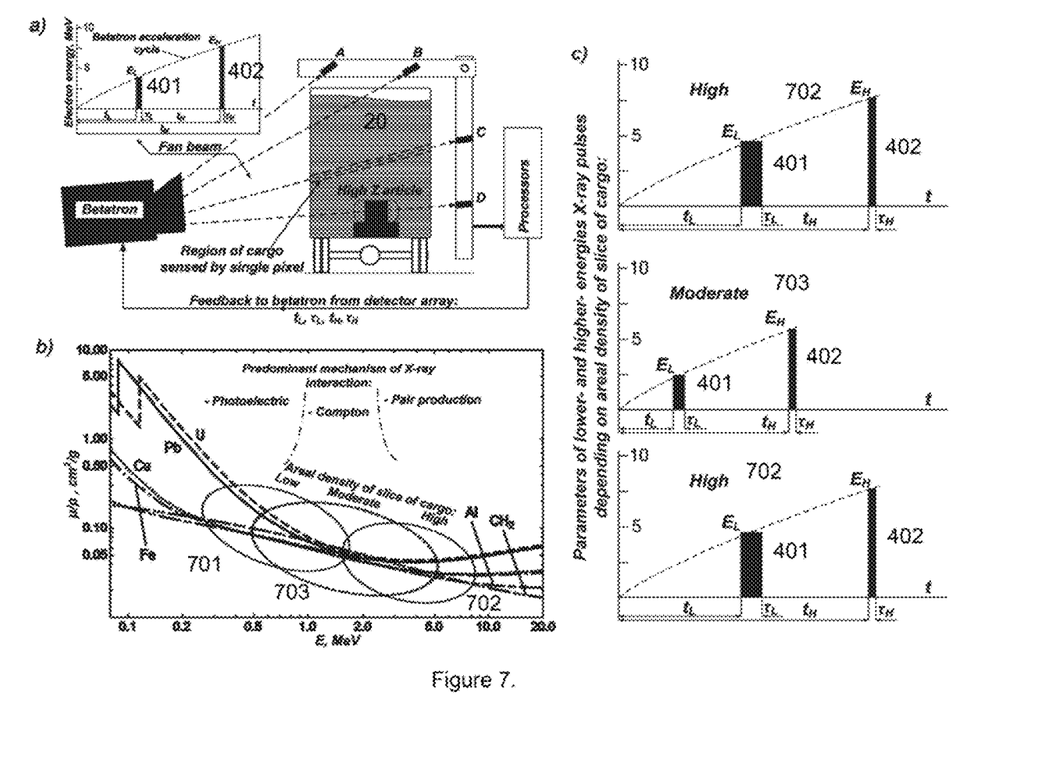
FIG. 7. Top left: Configuration of a betatron-based cargo X-ray inspection system with single-slice dual energy material discrimination; Bottom left: Selection of optimal regions for dual energy material discrimination; Right: Parameters of betatron pulses selected depends on areal density of cargo slice.

Real-time intelligent setting of the energies of the pulses depends on the X-ray attenuation in the cargo 20 measured with the previous slice. One of the advantages of the instant invention is the ability to intelligently select the range of X-ray energies optimal for material discrimination. The concept is illustrated for one embodiment in FIG. 7, bottom left, where the choice of higher and lower end-point energies, guided by the measured cargo attenuation, provides equally effective material discrimination for low- 701, high- 702, and the particularly difficult moderate- 703 areal densities of a region of cargo. In one embodiment, the continuous energy ramp during the betatron acceleration cycle provides an additional dimension for the material discrimination algorithm. Such a capability allows the possibility of utilizing iterative material discrimination algorithms, previously unfeasible due to hardware limitations. These methods would extend the region of material discrimination validity and improve overall material discrimination.

In one embodiment the positions and durations of low- 401 and high-energy 402 X-ray pulses is adjusted based on the material attenuation measured in the previous X-ray slice. Thus, the X-ray dose is better matched to the scanned cargo, resulting in a lower average radiation dose as compared to the interlacing technique.

Photon-Counting Detector Operation Mode.

Scattered radiation is one of the main factors limiting performance of cargo X-ray inspection systems. Scattering negatively affects image contrast, penetration and the range of thicknesses with effective material discrimination. Scatter plays a stronger role in cargo radiography than in typical medical imaging scenarios, even for low density cargo, with scatter-to-primary ratios typically ranging from 0.14 for very low density cargo, to between 0.20 and 0.40 for typical cargo, and higher yet for dense cargo. Scatter obscures the identification of regions where the primary photons have been highly attenuated since the background level is determined by scatter.

Figure 8:
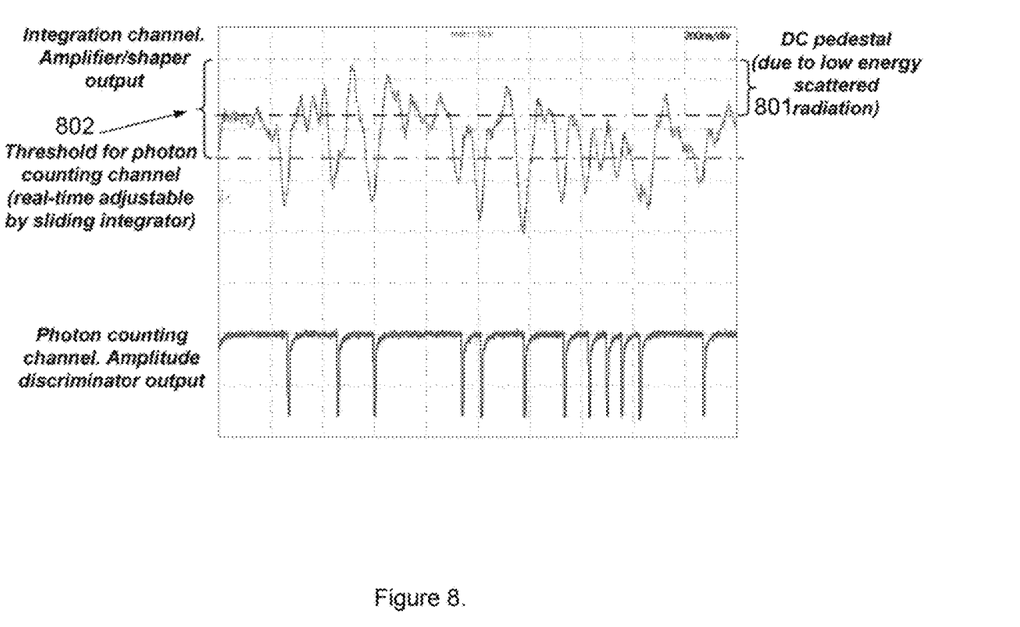
FIG. 8. Illustration of the operation of the fast detector in the X-ray photon counting mode. Oscillogram of the outputs of $PbWO_4$ high-energy X-ray detector with SiPM readout. Top trace: Amplifier-shaper output of integration channel. Bottom trace: Amplitude discriminator output of photon counting channel. A 2-microseconds part of 4 microseconds 6.0 MeV bremsstrahlung X-ray pulse transmitted through 300 mm of steel is shown here. Time scale is 200 ns/div.

In various embodiments one method to reduce the effect of scattered radiation is to use a photon-counting mode of detector operation with a scatter threshold 802. The energy of scattered X-ray photons is lower than energy of transmitted photons. Therefore, scattered photons are responsible for a DC pedestal 801 of output signal of a fast detector (see FIG. 8).

The duration of response of fast X-ray detectors is about 5 to 10 times shorter than the time internal between detected X-ray photons generated by proposed betatron. Therefore, in some embodiments the X-ray photon-counting operation mode can be used. This novelty extends the dynamic range beyond the limits of the integration mode of operation and reduces the effect of scattered radiation on the performance of the inspection system.

Material Discrimination Method with Fast Pulse Multi-Energy Betatron.

In further embodiments a short X-ray pulse operation mode is used. In these embodiments the maximum duration of the X-ray pulse is depend on the scintillation rise time for the radiation detectors. In one embodiment for a CsI(Tl) detector (rise time of scintillation is about 65 ns), about a 10 nanosecond duration of X-ray pulse or less would be used. In multiple embodiments the pulse time is selected so that only a small contamination of the Cherenkov fast component is detected by the beginning of the scintillation signal. X-ray pulse duration is determined by ensuring that each component, Cherenkov and scintillation, can be observed and subtracted by signal processing.

In various embodiments one type of detector employed in the detection of penetrating radiation that utilizes the Cherenkov effect, which occurs if the energy of the electrons and positrons generated in the detector medium by penetrating radiation (such as high energy X-rays) is above the Cherenkov threshold, which is to say that they travel through the medium at a speed exceeding the speed of light in the same medium. (In this context, the detecting medium may be referred to, herein, as the "radiator," in that it radiates Cherenkov emission.) Energetic charged species are created by photons incident on the detector medium either by electron recoil in a Compton scattering interaction or by pair production, and, in either case, may be referred to, herein, as "kinetic electrons," reflecting the fact that they are no longer bound to atoms in the medium. This Cherenkov emission threshold condition is given by $$n\beta > 1, \quad (I)$$

where n is the refractive index of the detector medium, and β is the ratio of the electron velocity θ to the speed of light in a vacuum c. The fundamentals of Cherenkov radiation and its application may be found in V. P. Zrelov, Cherenkov Radiation in High Energy Physics, (Jerusalem: Israel Program for Scientific Translation, 1970), which is incorporated herein by reference.

Cherenkov radiation is the electromagnetic "shock-wave" of light generated by a relativistic charged particle travelling beyond the speed of light in the medium. The photons of Cherenkov radiation have a continuous spectrum from the ultraviolet to the infrared, with intensity proportional to $\lambda^{-2}$. Therefore, Cherenkov radiation is stronger in the UV and the violet region of the visible spectrum than in the infrared. The duration of Cherenkov radiation in detectors is very short: typically, a few hundred picoseconds.

For sufficiently energetic X-rays the energy of the generated electrons can achieve the aforementioned threshold condition. For detectors designed for X-rays in the MeV region, the "effective Cherenkov threshold energy" is higher than the threshold indicated by Eqn. (1) due to partial energy transfer from photon to electron in Compton and pair production processes, and the limited light collection and quantum efficiency of the photodetector. In practice, the effective threshold energy can be between 1 and 2 MeV, depending on the detector configuration and the properties of the medium.

In contrast with Cherenkov radiation, the scintillation mechanism is the process of light generation by a moving charged particle exciting the medium. Typical scintillators generate light in the visible region. The duration of the light is dominated by the exponential decay of scintillation with decay times from tens to thousands of nanoseconds.

In some inorganic scintillation materials with extrinsic luminesce, the scintillation due to interaction with an x-ray/gamma photon has a relatively long delay. For example, in NaI(Tl) and CsI(Tl) single crystal scintillators, the rise times of scintillation are 40-50 and 60-80 nanoseconds respectively.

Figure 9:
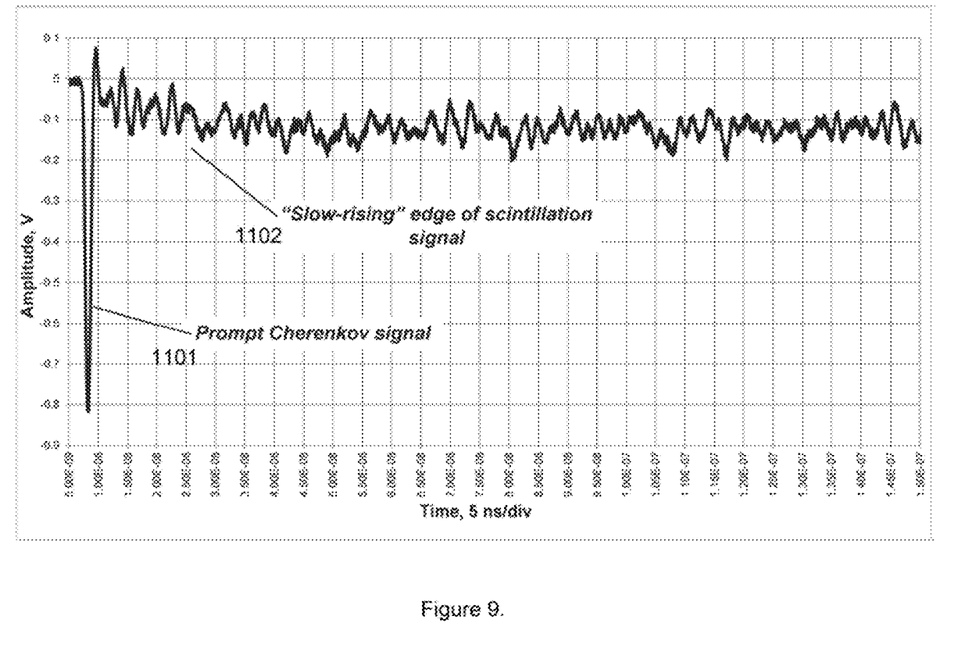
FIG. 9. Illustration of the operation of the fast detector in the short X-ray pulse mode using dual mode scintillation-Cherenkov detector. Response of CsI(Tl) detector to 2.61 MeV gamma photon. The rise time of scintillation is about 65 ns; the decay time is about 1000 ns.
Figure 10:
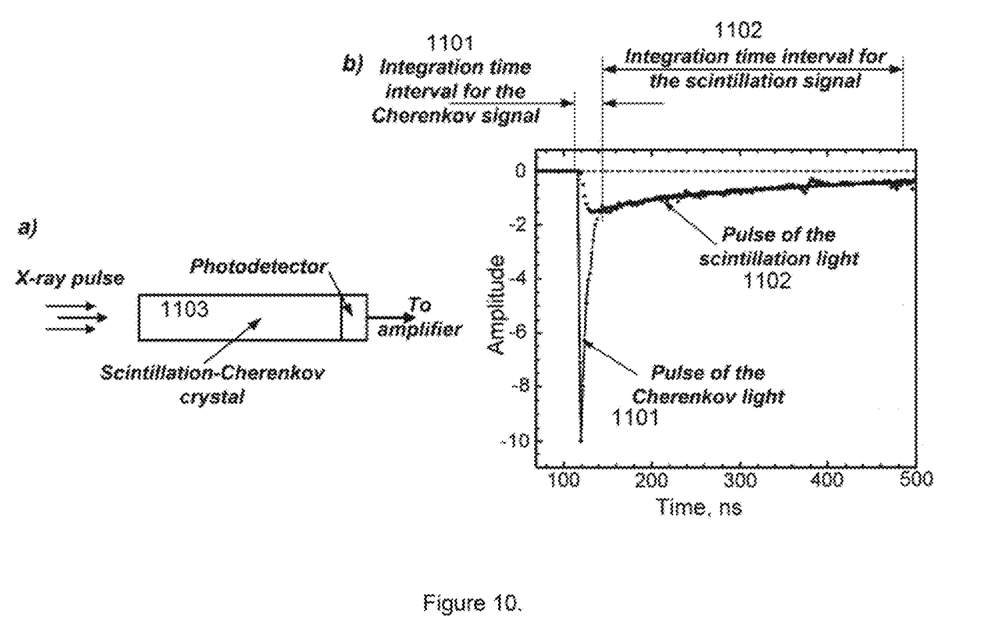
FIG. 10. Schematic view of the scintillation-Cherenkov detector with slow-growing scintillation emission, left, and diagram of the time intervals for acquisition of the Cherenkov and scintillation fraction of the signal, right.

If the energy of the photon is above Cherenkov threshold, two kind of lights are generated in such scintillators: prompt Cherenkov light 1101 and delayed scintillation light 1102 (see FIG. 9). If the interaction time is known, by using two acquisition time intervals 1001, 1002 (time windows) it will be possible to separately collect the Cherenkov 1101 and scintillation fractions 1102 of the light generated in same detector volume 1103 (see FIG. 10).

Figure 11:
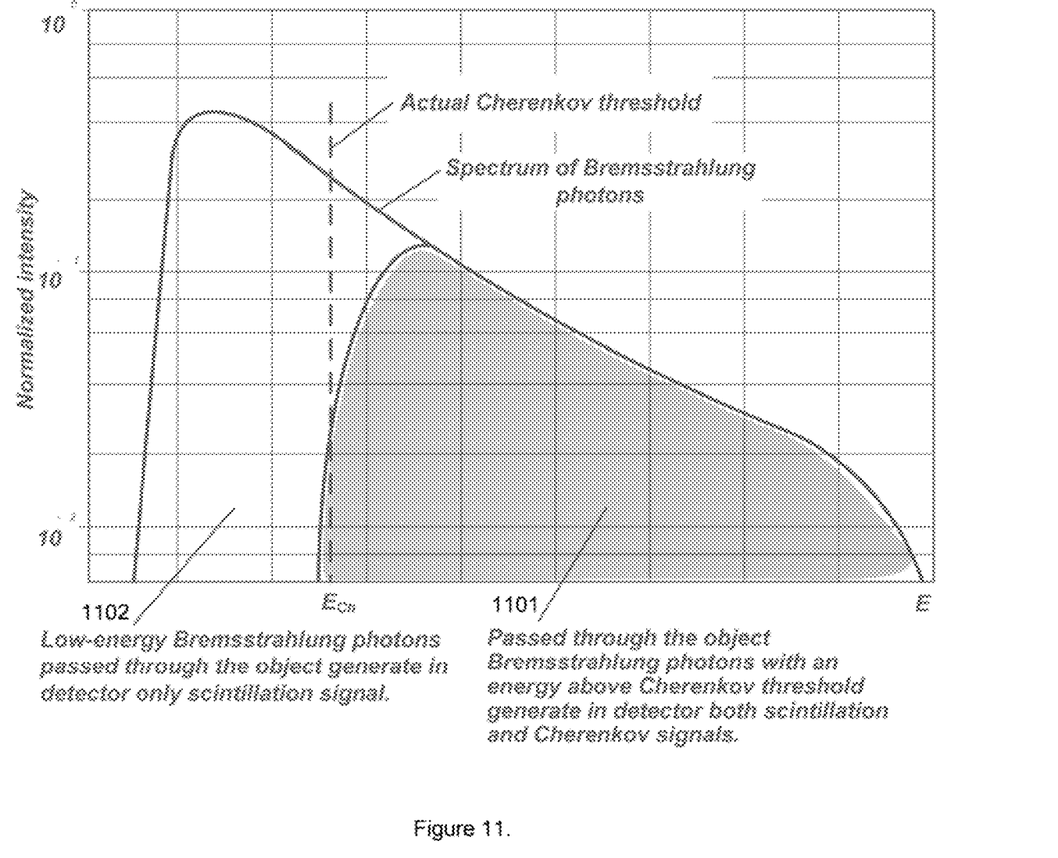
FIG. 11. Bremsstrahlung X-ray spectra transmitted through absorber (cargo).

For the Bremsstrahlung X-ray spectra of the beam transmitted through an absorber (cargo), the Cherenkov 1101 to scintillation 1102 ratio (high energy/low energy) depends on areal density and average atomic number Z of the absorber (see FIG. 11). Therefore, this ratio can be used for material discrimination in cargo radiographic systems with betatrons.

In a betatron, the duration of electron pulses extracted during the same acceleration cycle can be small: from 2 to 10 ns. The idea of extraction is the same as for the method with long duration pulses, but the extraction control pulses need to be much shorter.

In contrast with the long pulse extraction method, the short pulse method produces more information for material discrimination, and allows more accurate subtraction of background created by scattered radiation. For each X-ray pulse, the Scintillation-Cherenkov detector gives two signals: one due to scintillation and the other due to Cherenkov mechanisms. The ratio of these signals is Z-dependent, and both Cherenkov signals generated by low- and high-energy X-ray pulses, are not affected by scattered radiation as the scattered X-rays will tend to be below the Cherenkov threshold energy of equation 1.

The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

What is claimed is:

1. A system for cargo inspection comprising:
a betatron accelerating a beam of electrons internal to said betatron;
a Bremsstrahlung conversion target located internal to said betatron and positioned to overlap the path of said beam of electrons at a specific electron orbit;
said beam of electrons producing a beam of X-rays when said electron beam interacts with said Bremsstrahlung conversion target;
a collimator rigidly attached to said betatron and positioned between said betatron and said cargo forming a fan beam of said beam of X-rays incident upon said cargo wherein said cargo is sampled in a slice bounded by said fan beam of said beam of X-rays;
a variable magnetic field generator proximal to said betatron producing a time dependent magnetic field internal to said betatron wherein said magnetic field modifies the electron orbits near the Bremsstrahlung conversion target;
a first modification to said time dependent field internal such that said electron beam partially intercepts radially said Bremsstrahlung conversion target producing a first pulse of X-rays with a first end-point energy;
a second modification to said time dependent field internal following said first modification such that said electron beam continues to circulate within said betatron but does not intercept said Bremsstrahlung conversion target;
a radiation detector positioned distal from said betatron and intercepting said first pulse of X-rays and receiving the part of the first pulse of X-rays that pass through said cargo;
a third modification to said time dependent field internal following said second modification such that said electron beam intercepts said Bremsstrahlung conversion target producing a second pulse of X-rays with a second end-point energy;
said radiation detector receiving the part of the second pulse of X-rays that pass through said cargo from said second pulse of X-rays;
wherein said first pulse of X-rays and said second pulse of X-rays are generated from the same acceleration cycle of said betatron;
said cargo translated relative to said fan beam of said beam of X-rays and perpendicular to the plane of said fan beam of X-rays and repeating first and second pulse production and measurement for subsequent inspection slices of said cargo;
a processor for receiving data from said radiation detector;
said processor using said data to derive relative attenuation of said first pulse of X-ray and said second pulse of X-rays transmitted through said cargo, said relative attenuation computed for each said first and said second pulse of said penetrating radiation transmitted through said cargo; and
said processor deriving a material characteristic of multiple sections of said cargo.

2. The system of claim 1 wherein:
said first modification to said time dependent field internal producing said first pulse of X-rays with pulse duration greater than 10 microseconds;
said third modification to said time dependent field producing said second pulse of X-rays with a pulse duration greater than 10 microseconds.

3. The system of claim 2 wherein:
said radiation detector is an X-ray detector operating in a photon counting mode.

4. The system of claim 3 wherein:
said radiation detector is a scintillation detector.

5. The system of claim 1 further comprising:
said radiation detector is a linear array of radiation detectors spatial distributed in the plane of said fan-beam of penetrating radiation.

6. The system of claim 3 wherein:
said radiation detector comprises an array of direct conversion detectors.

7. The system of claim 2 wherein:
said first modification to said time dependent field internal producing said first pulse of X-rays with pulse duration less than 1000 microseconds;
said third modification to said time dependent field producing said second pulse of X-rays with a pulse duration less than 1000 microseconds.

8. The system of claim 2 further comprising:
a forth modification to said time dependent field internal to said betatron modifying the electron orbits such that said electron beam intercepts said Bremsstrahlung conversion target producing a third pulse of X-rays with a higher end-point energy than said first pulse of X-rays and a lower end-point energy than said second pulse of X-rays;
wherein said third modification to said time dependent field internal following said second modification such that said electron beam partially intercepts said Bremsstrahlung conversion target producing a second pulse of X-rays with a second end-point energy;
said radiation detector receiving the part of the third pulse of X-rays that pass through said cargo;
wherein said first pulse of X-rays and said second pulse of X-rays and said third pulse of X-rays are generated from the same acceleration cycle of said betatron;
wherein said first pulse of X-rays occurs first followed by said third pulse of X-rays followed by said second pulse of X-rays;
said cargo translated relative to said fan beam of said penetrating radiation and perpendicular to the plane of said fan beam of X-rays and repeating first, third and second pulse production and measurement for subsequent inspection slices of said cargo;
said processor using said data to derive relative attenuation of said beam of X-rays transmitted through said cargo, said relative attenuation computed for each said first, said third and said second pulse of X-rays transmitted through said cargo.

9. The system of claim 1 further comprising:
said processor computing a modified range of X-ray energies for material decomposition from one slice of said cargo and modifying said variable magnetic field generator to apply new timing to said variable magnetic field generator to produce a new first X-ray end-point energy and a new second X-ray end-point energy within a subsequent betatron acceleration cycle corresponding to said modified range of X-ray energies.

10. The system of claim 9 wherein:
said first X-ray end-point energy is modified in real time based upon data from said radiation detector;
such that said first X-ray end-point energy modification is configured based upon said measured data from said X-ray detector from the previously sampled X-ray transmission characteristics by modification in the timing of activation of said variable magnetic field generator.

11. The system of claim 9 wherein:
said second X-ray end-point energy is modified in real time based upon data from said radiation detector;
such that said second X-ray end-point energy modification is configured based upon said measured data from said X-ray detector from the previously sampled X-ray transmission characteristics by modification in the timing of activation of said variable magnetic field generator.

12. The system of claim 1 wherein:
said first modification to said time dependent field internal producing said first pulse of X-rays with pulse duration less than 10 nanoseconds;
said third modification to said time dependent field producing said second pulse of X-rays with a pulse duration less than 10 nanoseconds.

13. The system of claim 12 wherein:
said radiation detector is a Scintillation-Cherenkov detector producing a scintillation signal component and a Cherenkov signal component.

14. The system of claim 12 further comprising:
a forth modification to said time dependent field internal to said betatron modifying the electron orbits such that said electron beam intercepts said Bremsstrahlung conversion target producing a third pulse of X-rays with a higher end-point energy than said first pulse of X-rays and a lower end-point energy than said second pulse of X-rays;
wherein said third modification to said time dependent field internal following said second modification such that said electron beam partially intercepts said Bremsstrahlung conversion target producing a second pulse of X-rays with a second end-point energy;
said radiation detector receiving the part of the third pulse of X-rays that pass through said cargo;
wherein said first pulse of X-rays and said second pulse of X-rays and said third pulse of X-rays are generated from the same acceleration cycle of said betatron;
wherein said first pulse of X-rays occurs first followed by said third pulse of X-rays followed by said second pulse of X-rays;
said cargo translated relative to said fan beam of said penetrating radiation and perpendicular to the plane of said fan beam of X-rays and repeating first, third and second pulse production and measurement for subsequent inspection slices of said cargo;
said processor using said data to derive relative attenuation of said beam of X-rays transmitted through said cargo, said relative attenuation computed for each said first, said third and said second pulse of X-rays transmitted through said cargo.

15. The system of claim 13 wherein:
said processor computes a high energy component for said radiation detector data based on said Cherenkov detector signal and a low energy component based on said scintillation detector signal.

16. The system of claim 12 further comprising:
said processor computing an optimal range of X-ray energies for material decomposition from one slice of said cargo and modifying said variable magnetic field generator to apply new timing to said variable magnetic field generator to produce a new first X-ray end-point energy and a new second X-ray end-point energy corresponding to said optimal range of X-ray energies.

17. The system of claim 1 wherein:
said first modification to said time dependent field internal producing said first pulse of X-rays with pulse duration less than 50 nanoseconds;
said third modification to said time dependent field producing said second pulse of X-rays with a pulse duration less than 50 nanoseconds.

18. A multi-energy betatron comprising:

a betatron accelerating a beam of electrons internal to said betatron;

said betatron having a distal exit port for accelerated electrons;

a variable magnetic field generator internal to said betatron producing a time dependent magnetic field internal to said betatron wherein said magnetic field modifies the electron orbits near the distal radii of said betatron;

a first modification to said time dependent magnetic field internal to said betatron modifying the electron orbits such that said electron beam partially intercepts radially said distal exit port producing a first pulse of electrons with a lower energy and said electron beam partially bypasses said distal exit port;

said time dependent field internal to said betatron modifying the electron orbits such that said electron beam intercepts said distal exit port producing a second pulse of electrons with a higher energy;

wherein said first pulse of electrons and said second pulse of electrons are generated from the same acceleration cycle of said betatron.

19. A multi-energy X-ray generation system comprising:

a betatron accelerating a beam of electrons internal to said betatron;

a Bremsstrahlung conversion target located internal to said betatron and positioned to overlap the path of said beam of electrons at a specific electron orbit;

said beam of electrons producing a beam of X-rays when said electron beam interacts with said Bremsstrahlung conversion target;

a variable magnetic field generator internal to said betatron producing a time dependent magnetic field internal to said betatron wherein said magnetic field modifies the electron orbits near the Bremsstrahlung conversion target;

said time dependent field internal to said betatron modifying the electron orbits such that said electron beam partially intercepts radially said Bremsstrahlung conversion target producing a first pulse of X-rays with a lower end-point energy and said electron beam partially bypasses said Bremsstrahlung conversion target;

said time dependent field internal to said betatron modifying the electron orbits such that said electron beam intercepts said Bremsstrahlung conversion target producing a second pulse of X-rays with a higher end-point energy;

wherein said first pulse of X-rays and said second pulse of X-rays are generated from the same acceleration cycle of said betatron.

* * * * *